Sept. 24, 1963   O. GROSSKINSKY ETAL   3,104,959
DESULFURIZATION OF COKE OVEN GASES
Filed Nov. 23, 1956
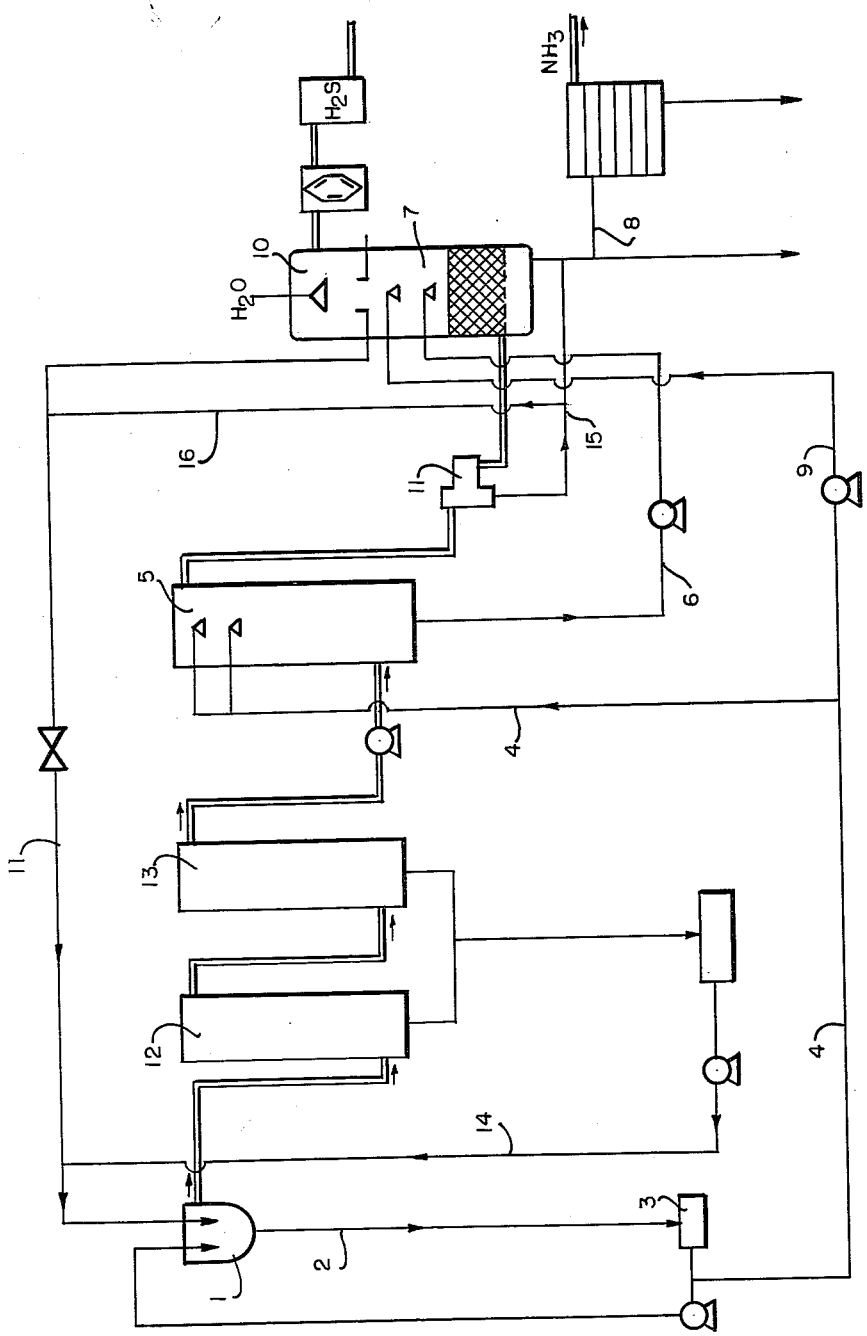
INVENTORS
Otto Grosskinsky
Georg Huck
BY Walter Klempt
Thomas V. Michaelis
ATTORNEY United States Patent Office 3,104,959
Patented Sept. 24, 1963

3,104,959
DESULFURIZATION OF COKE OVEN GASES
Otto Grosskinsky, Dortmund-Kirchhoerde, Georg Huck and Walter Klempt, Dortmund-Eving, Germany, assignors to Bergwerksverband zur Verwertung von Schutzrechten der Kohlentechnik G.m.b.H., Dortmund-Eving, Germany
Filed Nov. 23, 1956, Ser. No. 623,955
Claims priority, application Germany Nov. 28, 1955
5 Claims. (Cl. 55—48)

This invention relates to coke oven gases, and more particularly to the desulfurization thereof.

The scrubbing of coke oven gases with ammonia water in various kinds of scrubbers, at normal pressure and with the observation of short periods of contact of the gas with the washing liquor, is a well known expedient. This "selective scrubbing" removes hydrogen sulfide from the gas almost completely, carbon dioxide, however, only to a very small extent. If the operation proceeds at elevated pressure, while the periods of contact of the gas with the washing liquor are maintained the same as with normal pressure, the quantity of carbon dioxide removed, apart from hydrogen sulfide, is about the same as with the operation at normal pressure. Yet, this scrubbing under pressure can not be considered a "selective scrubbing" within the original meaning of this term. This does not reflect on the merits of the scrubbing under pressure, however, as it involves, nevertheless, such valuable features as an increased concentration of hydrogen sulfide in the scrubbing liquor, and a more complete removal of hydrogen sulfide from the gas. A prerequisite for a successful removal of the hydrogen sulfide, however, is the use of ammonia water free of carbon dioxide, i.e. deacidified ammonia water.

It is one of the primary objects of the present invention to remove hydrogen sulfide from coke oven gases without having recourse to a deacidified washing liquor.

Other objects, and the manner in which the same are attained, will become apparent as this specification proceeds.

The invention contemplates passing the effluent of the ammonia scrubbing step which as usual, is arranged to follow the hydrogen sulfide scrubbing step, and all condensates deriving from the cooling of the crude gas, to the gas offtake or collecting main. The water (deriving from the coal) which thus is rendered surplus in the circulation of the flushing of the main and which is substantially free from ammonia and is referred to hereinbelow as collecting main condensate, is withdrawn and after having been detarred, used for a preliminary scrubbing of the completely cooled gas, gas flow velocities of about 1 to 5 meters per second being maintained in the scrubber. The gas thus pre-washed is compressed, cooled again and scrubbed once again with the liquid deriving from the preliminary scrubbing step maintaining the same gas flow velocities. The liquid from this pressure scrubbing step is passed, together with the aqueous condensates obtained in the course of the compression and the subsequent cooling, to a still. The gas liberated under pressure, from hydrogen sulfide, subsequently is washed with water in order to recover the residual ammonia and the effluent scrubbing water passes, as mentioned above, to the main; the compressor condensates, too, instead of being passed to the still, may be conducted to the main.

The method according to the invention is based on the discovery that the liquid of a preliminary scrubbing step is still capable of absorbing, under elevated pressure, a considerable volume of hydrogen sulfide. In order to render the method successful it is important, however, that the ammonia content of the gas is increased, by recycling the gas liquor and the like to the collecting main. Provided this condition is satisfied, and the collecting main condensate is used once for the scrubbing step at normal pressure, and the effluent of this scrubbing stage is used, again, for the scrubbing step at elevated pressure, substantially the total hydrogen sulfide content of the coke oven gas can be removed by means of the condensates available.

According to a particularly advantageous, and therefore preferred embodiment of the invention, the collecting main condensate is passed to the pre-scrubbing stage not in its entirety, but only in part. In elaboration of the basic concept of the invention, it has been found that about one half, i.e. about 40 to 60 percent, of the collecting main condensate are usually sufficient for removing, at normal pressure, considerable quantities of ammonia and hydrogen sulfide, and that an increase in the quantity of condensate does not substantially increase the scrubbing yield in the pre-scrubbing stage. For this reason, it is recommended to save the remainder of the collecting main condensate for use in the pressure scrubbing stage where the gas treated, in the lower part of the pressure scrubber, with the effluent of the preliminary scrubber, is postwashed with the yet unspent collecting main condensate. The improved overall result of this procedure is also explained by the fact that the preliminary scrubbing with the assistance of about half the quantity of the collecting main condensate, leaves such a quantity of ammonia in the gas that in the course of the compression and the subsequent cooling step, still only small quantities of ammonia are condensing in the form of the compressor condensates rich in carbon dioxide and containing about 10 percent ammonia, which are useless for scrubbing purposes. At the same time, a certain quantity of ammonia, i.e. about 2 g. per normal cubic meter, remains in the compressed gas, which is advantageous as the removal of hydrogen sulfide under pressure, is facilitated by a high ammonia content in the gas. If the preliminary scrubbing step were omitted, larger quantities of compressor condensates would be obtained, and consequently an increased quantity of ammonia in the form of this less desirable 10 percent ammonium carbonate or bicarbonate solution, which can be utilized in the removal of hydrogen sulfide only under certain conditions. On the other hand, while a preliminary scrubbing step using all the collecting main condensate available, removes a maximum of hydrogen sulfide and ammonia already in the normal pressure stage, i.e. about 60 percent of the hydrogen sulfide and the bulk of the ammonia, this is offset by the fact that the entire effluent of the preliminary scrubbing stage is no longer capable of removing the equally large quantities of hydrogen sulfide in the pressure scrubber, so that the overall yield is inferior to that obtained in a scrubbing procedure using divided collecting main condensates.

In the drawing accompanying this application and forming part thereof, a preferred embodiment of the invention is illustrated diagrammatically by way of example.

The condensed water effluent from the gas collecting main 1 passes through a conduit 2 into the tar separator 3 whereupon, after cooling, about half of it is conducted, through a conduit 4, to the scrubber 5 wherein a major part of the ammonia, and about half the hydrogen sulfide, are removed from the gas by a selective scrubbing operation. The effluent is passed through a conduit 6, to the pressure scrubber 7 wherein an additional volume of hydrogen sulfide is removed from the gas. The scrubbing water passes through a conduit 8, into an ammonia still. The remainder of the condensate free from ammonia, discharged through the conduit 4, is conveyed through a conduit 9, to the pressure scrubber 7, and more particularly a portion thereof which is well above the point of entry of the effluent conveyed through conduit 6. The scrubbing water, finally, is passed in its entirety through the conduit 8 into the still. The gas, from which hydrogen sulfide has been removed to a far-reaching extent, is passed through the ammonia scrubber 10 charged with fresh water, with the result that the last remnants of ammonia are removed from the gas. Subsequently, the removal by scrubbing of benzene and the final purification from hydrogen sulfide by means of a dry absorption material, are effected in the usual manner.

The liquid of the ammonia scrubber 10 is passed through a conduit 11, to the collecting main 1. The condensates of the coolers 12 and 13 are likewise pumped into the collecting main 1. In consequence, the concentration of ammonia in the cooled crude gas is materially increased, with the result that in the preliminary scrubbing step effected, with the assistance of the condensates free from ammonia, in the scrubber 5, apart from 60–70 percent of ammonia, also about 50–60 percent of hydrogen sulfide are removed.

The preliminary scrubbing has the further advantage that it also removes the bulk of the hydrocyanic acid which, because of its strong corrosive properties, would be likely to damage the gas compressor installation.

The hot crude gas, on being cooled in the coolers 12 and 13 and subjected to the preliminary scrubbing, is compressed and cooled again; in the course of this procedure, a compressor condensate is obtained which consists of aromatic hydrocarbons and an aqueous about 10 percent solution of ammonia. Following separation of the aromatic constituents, the ammonia containing water is passed either through the conduit 15 to the still, or through conduits 16 and 11, also to the collecting main 1.

If the present method is applied to a gas containing about 10 g. ammonia, 35 g. carbonic acid and 7.5 g. hydrogen sulfide per cubic meter, gas and liquors exhibit about the following compositions:

Per 1000 cubic meters of crude gas, about 1 cubic meter of water substantially free from ammonia (1–3 g. $NH_3$ per liter) can be withdrawn from the tar collecting main 1 through the conduit 2 and the tar separator 3. If, on cooling, about half of this volume of water is conveyed to the preliminary scrubber 5, the gas escaping therefrom still contains about 3.5 g. of hydrogen sulfide per cubic meter, while the effluent contains about 7 g. of hydrogen sulfide and 12 g. of ammonia per liter. This effluent is passed, together with the remaining half of the collecting main condensate, to the pressure scrubber. The gas escaping from the pressure scrubber still contains about 0.5 g. of hydrogen sulfide. If the total collecting main condensate is subsequently conducted through both scrubbers, the gas recovered from the pressure scrubber still contains about 1.2 g. of hydrogen sulfide. If, for sake of comparison, the preliminary scrubbing step is dispensed with, the gas pressure-scrubbed collecting main condensate still contains about 2.5 g. of hydrogen sulfide.

The terminal ammonia scrubber is charged with about 0.5 cubic meter of fresh water per 1000 normal cubic meters, whereby a gas free from ammonia is obtained. The water discharged from the ammonia scrubber contains about 4–8 g. of ammonia, and 5–8 g. of carbonic acid per liter. The return of this water to the collecting main, together with the cooler condensates, and the 10 percent compressor condensate of which about 0.1 cubic meter is obtained per 1000 normal cubic meters, the ammonia content of the collected gas can be increased to about 9.5 g. The volume of collecting main condensate available ranges, dependent on the starting material or the composition of the gas, from about 0.5 to about 1.5 cubic meters per 1000 cubic meters of crude gas. The compression of the gas, at least, should amount to 5 atmospheres, but may be increased to about 20 atmospheres, with the result that the degree of purification is enhanced.

Dependent on the ratio at which ammonia and hydrogen sulfide are present in the crude gas, it may be necessary to supply additional ammonia for the scrubbing operation, particularly if the aim is to remove substantially 100 percent of the hydrogen sulfide. In this event, the ammonia from the still may be resorted to, or even, if available, gaseous ammonia which is introduced, for best results, at a medium level, into the hydrogen sulfide pressure scrubber 7.

We have found that the absorption characteristics of the scrubbing liquor with respect to hydrogen sulfide, can be increased also by effecting the pressure scrubbing at temperatures below 10° C. for which purpose, the compressed gas or the scrubbing liquor are cooled correspondingly. Particularly when scrubbing under pressure, e.g. the pressure of long distance gas, the cooling has been found to enhance the scrubbing process very materially.

We wish it to be understood that we do not desire to be limited to the exact details of installation and operation shown and described as numerous modifications within the scope of the following claims and involving no departure from the spirit of the invention, nor any sacrifice of the advantages thereof, may occur to a person skilled in the art.

We claim:

1. The method of removing hydrogen sulfide and ammonia from coal distillation gases which comprises cooling said gases whereby gas liquor is obtained, scrubbing said cooled gases in a preliminary scrubbing operation with detarred collecting main condensates while maintaining a gas velocity from about 1 to about 5 meters per second, compressing and cooling the pre-scrubbed gases and scrubbing them in a second pressure scrubbing stage with the liquid effluent of the first scrubbing stage maintaining the same gas velocity, subjecting the gases emerging from the second scrubbing stage to a fresh water terminal ammonia scrubbing operation to remove the remainder of ammonia, contacting crude gas with the liquid effluent of said terminal ammonia scrubbing operation and with the gas liquor, withdrawing and cooling the collecting main condensate thus obtained, said collecting main condensate being utilized in said preliminary scrubbing operation.

2. The method according to claim 1, wherein the liquid effluent of the second pressure scrubbing stage is distilled, and ammonia having a comparatively low content of carbonic acid is withdrawn from the distillation and conducted to said pressure scrubbing stage.

3. The method according to claim 1 wherein only about 40 to 60 percent of the collecting main condensate is conducted to the pre-scrubbing operation, the remainder being conducted directly to the second, pressure scrubbing operation.

4. The method according to claim 1, wherein the second, pressure scrubbing operation is effected at temperatures not substantially exceeding 10° C.

5. Apparatus for removing hydrogen sulfide and ammonia from coal distillation gases, comprising a gas collecting main, means for condensing water from gas in said collecting main, a preliminary scrubber, means including a tar separator for conducting part of the aqueous condensate from said main to said scrubber, a second, pressure scrubber, means for separately conducting the liquid and gaseous effluents from the preliminary scrubber to said pressure scrubber, means for conducting the remainder of the aqueous collecting main condensate to the pressure scrubber, an ammonia still, means for conducting the scrubbing liquor from the pressure scrubber to said still, a fresh water ammonia scrubber, means for conducting the gas recovered from the still to said ammonia scrubber, means for conducting the liquid effluent from said ammonia scrubber to said collecting main, cooling means for the hot crude gas positioned in said apparatus between the collecting main and preliminary scrubber, means for compressing and cooling the gas escaping from the preliminary scrubber, and means for conducting the resulting cooling and compressor condensates to said collecting main.

References Cited in the file of this patent

UNITED STATES PATENTS

| | | |
|---|---|---|
| 1,487,768 | Torrey | Mar. 25, 1924 |
| 2,106,734 | Gollmar | Feb. 1, 1938 |
| 2,162,838 | Cole et al. | June 20, 1939 |
| 2,596,785 | Nelly et al. | May 13, 1952 |
| 2,675,296 | Gollmar | Apr. 12, 1954 |